(12) United States Patent
Chazan et al.

(10) Patent No.: US 12,229,290 B1
(45) Date of Patent: Feb. 18, 2025

(54) SYSTEM AND PROCESS FOR THE VERIFICATION OF DATA

(71) Applicant: EFTSURE PTY LTD, North Sydney (AU)

(72) Inventors: Mark Mervyn Chazan, St Ives (AU); Michael Kontorovich, Maroubra (AU)

(73) Assignee: EFTSURE PTY LTD, North Sydney (AU)

( * ) Notice: Subject to any disclaimer, the term of this patent is extended or adjusted under 35 U.S.C. 154(b) by 0 days.

(21) Appl. No.: 18/434,682

(22) Filed: Feb. 6, 2024

Related U.S. Application Data

(63) Continuation of application No. 17/273,460, filed as application No. PCT/AU2019/050944 on Sep. 4, 2019, now abandoned.

(30) Foreign Application Priority Data

Sep. 4, 2018 (AU) .................. 2018903266

(51) Int. Cl.
*G06F 21/62* (2013.01)
*G06F 21/00* (2013.01)
(Continued)

(52) U.S. Cl.
CPC ........ *G06F 21/6209* (2013.01); *G06F 21/604* (2013.01); *G06Q 30/04* (2013.01)

(58) Field of Classification Search
CPC ........ G06F 21/604; G06F 21/60; G06F 21/64; G06F 21/645; G06F 21/12; G06F 21/16; G06F 21/62
See application file for complete search history.

(56) References Cited

U.S. PATENT DOCUMENTS

2006/0095372 A1 5/2006 Venkatasubramanian et al.
2008/0168135 A1 7/2008 Redlich
(Continued)

FOREIGN PATENT DOCUMENTS

CN 108268661 7/2018
EP 3086271 10/2016

OTHER PUBLICATIONS

Extended European Search Report (EESR) with Written Opinion for EP 19857188.7 (based on PCT/AU2019/050944) dated Mar. 21, 2022, pp. 1-7.

(Continued)

*Primary Examiner* — Edward Zee
(74) *Attorney, Agent, or Firm* — McDonnell Boehnen Hulbert & Berghoff LLP

(57) ABSTRACT

The present invention relates to an apparatus and method for verification of data contained in an unstructured data source, such as a supplier invoice. It is very difficult to obtain information from an unstructured data source, such as an invoice, using processing technology, without error. The apparatus and method are arranged to locate a predetermined data element in the invoice, using an optical character recognition application. The predetermined data element may be a company number, such as an ABN. The ABN can then be used to access databases to obtain further information relating to the supplier. For example, account details. The further information can be cross referenced against the unstructured data to confirm that the further information, such as account number is present in the unstructured data.

13 Claims, 8 Drawing Sheets

(51) Int. Cl.
*G06F 21/60* (2013.01)
*G06Q 30/04* (2012.01)

(56) References Cited

U.S. PATENT DOCUMENTS

| | | |
|---|---|---|
| 2008/0215489 A1 | 9/2008 | Lawson |
| 2013/0287265 A1* | 10/2013 | Nepomniachtchi .......................... G06Q 20/3276 382/115 |
| 2014/0379584 A1 | 12/2014 | Ward |
| 2018/0025225 A1 | 1/2018 | Guzmon |

OTHER PUBLICATIONS

The International Search Report (ISR) with Written Opinion for PCT/AU2019/050944 dated Nov. 19, 2019, pp. 1-13.
Characterization and detection of taxpayers with false invoices using data mining techniques; Pamela Castellon Gonzalez; Elsevier; 2012; pp. 1-10(Year: 2012).

\* cited by examiner

| Business Payee | | | | |
|---|---|---|---|---|
| Business Name | ABN Number | Bank Account Name | BSB Number | Account Number |
| Peter Gray & Associates | 123 567 789 | Peter Gray Pty Ltd | 032 156 | 1002 5566 |
| ABC Printing Pty Ltd | 345 678 988 | ABC Printing Pty Ltd | 055 126 | 1045 3588 |
| Café 101 | 322 688 907 | John & Sue Trust Account | 055 155 | 1788 3228 |

| Personal Payee | | | |
|---|---|---|---|
| First Name and Surname | Date of Birth | Bank Account Name | BSB Number | Account Number |
| Tony Smith | 15/05/1968 | Tony Smith | 144 512 | 154545 4545 |

FIGURE 3

SYSTEM AND PROCESS FOR THE VERIFICATION OF DATA

CROSS REFERENCE TO RELATED APPLICATION

This application is a continuation of U.S. application Ser. No. 17/273,460, filed Mar. 4, 2021, which is U.S. national phase of International Application No. PCT/AU2019/050944, filed Sep. 4, 2019, which claims priority to Australian Patent Application No. 2018903266, filed Sep. 4, 2018, all of which are incorporated by reference herein in their entirety.

FIELD OF THE INVENTION

The present invention relates to a system and process for the verification of data and, particularly, but not exclusively, to a system and process for the verification of data obtained in an unstructured format, and, particularly, but not exclusively, to a system and process for the verification of supplier data.

BACKGROUND OF THE INVENTION

In any business transaction, for example where a customer and supplier are dealing with each other, it is important that accurate details of the parties to the transaction are known. When a customer is dealing with a supplier, it is important that they know the suppliers' correct financial details, such as account number, so that they can pay them. It is also important that they know other information, such as whether the supplier is in good, liquid business condition (otherwise they may not be able to supply the service/product that the customer is paying for).

Accurate financial and credit information may also be important in person to person dealings e.g. transactions between individuals.

The applicants earlier patent application, "A Vendor Management System and Method" (AU 2018900216), the disclosure of which is incorporated herein by reference, discloses a system which enables supplier details to be obtained and managed so that customers can ensure the validity of the details.

Applicants earlier International Application number PCT/AU2015/000291 entitled "Online Payment Authentication Method & System", the disclosure of which is incorporated herein by reference, discloses a system where a user can check and verify payment details before paying a supplier on-line.

Customers often receive invoices from suppliers either by email or even in the post. It is extremely difficult, if not impossible, for a recipient of an invoice from a supplier to note that the invoice;

1. Originated from the supplier themselves or whether the suppliers' email has been compromised.
2. It is a legitimate or fake invoice.
3. It is a legitimate email but it has been maliciously altered by a fraudster such that the banking or other details (e.g. ABN—Australian Business Number) are incorrect.

In Australia and many other jurisdictions, Banks effect payments based purely on Account number details. They ignore the name of the account. If a legitimate invoice has been doctored by a fraudster such that everything is the same as the original (including the bank account name), but the account details are changed to those controlled by the fraudster and the recipient uses these details to make a payment, the payment will go to the fraudster.

Furthermore, in Australia it is difficult for a recipient of an invoice to easily determine if the ABN (Australian Business Number) on the invoice is valid, current, GST (Australian Goods and Services Tax) registered and applicable to the business name on the invoice. In Australia, there have been instances of trade suppliers using other companies' ABNs on their invoices to essentially rort the GST.

Other jurisdictions than Australia are also faced with the same issue, that it is not easy to determine whether company details (Company Register Numbers or identifiers for a particular jurisdiction) are valid, and whether other associated items (e.g. Goods and Services Tax or VAT) are registered are correctly specified.

Recipients also can't easily check if the invoice they are being asked to pay is to a company that may not be able to deliver the goods or service because the company may be in financial difficulty.

Currently, on receipt of an invoice, if the recipient wanted to check all the above, they would need to do manual lookups on a company register site, know how to interpret and understand the implications of the result, do a separate manual credit check with a credit bureau and try and independently find a phone number and call the supplier to ask if the bank account details on the invoice are correct. All these processes are extremely inefficient, costly and fraught with risk because the recipient is typically not trained in what to ask and look for. Further, it is typically not practical to manually perform these checks when dealing with large numbers of invoices.

Another problem with financial documents, such as invoices, received from suppliers, whether received by email, web, post or other form, is that they usually comprise unstructured data. Invoices typically display many different numbers, identifiers, references, amounts, etc. positioned on the invoice document in no consistent fashion from supplier to supplier. The invoice may also include free format text giving information such as the suppliers business name and other information, again in no particular specific consistent positions on the invoice documentation. There is essentially no standard way of displaying all the information on invoices.

This makes it very difficult to process the information from such documents as invoices by computer systems. This results in much of the interpretation currently being carried out manually, with the disadvantages discussed above. Alternatively where invoices are attempted to be interpreted electronically, there is a high error rate because of the difficulty in distinguishing between e.g. numerous numeric fields across different invoice formats.

SUMMARY OF THE INVENTION

In accordance with a first aspect, the present invention provides a method for verification of data contained in an unstructured data source, comprising the steps of:
  processing the unstructured data source to search for a predetermined data element recognisable in the unstructured data, to locate the predetermined data element;
  utilising the located predetermined data element, accessing a database source and locating at least one further data element stored in the database source associated with the predetermined data element;

utilising the further data element and processing the unstructured data source to search for the further data element within the unstructured data, and comparing the further data element located in the unstructured data with the further data element from the database, and providing a verification indication, based on the comparison.

In an embodiment, the method is implemented by a computer.

In an embodiment, the unstructured data may be a physical or electronic (e.g. PDF) document. The document may be an invoice, or a statement, or another applicable document, for example, from a supplier to a customer.

In an embodiment, the predetermined data element may be recognisable because it has a particular, known structure in itself.

In an embodiment, the predetermined data element is a company identifier, such as (in Australia) an ABN. In Australia, the ABN is a relatively structured number. It is an 11 digit number structured as a 9 digit identifier with two leading check digits. Company identifiers or other similar data relating to companies, in other jurisdictions, may be similarly also structured. In Australia, in this embodiment, the ABN may be recognised because of its relatively structured format. In an embodiment, the method may comprise the step of looking up a register to check that the ABN is a valid ABN (e.g. looking up the Australian Business Register—ABR).

In an embodiment, the identified ABN is then cross referenced with a database which includes account details (e.g. account number). The account number is obtained from the database and then cross referenced back again to the unstructured data, which is processed, using the account details, to locate account details within the unstructured data. Once these have been located, they can be confirmed by matching against the account details obtained from the database of known (already verified) account details. A verification can then be provided. In this embodiment, therefore, there is preferably the advantage that account details in unstructured data (such as an invoice document) can automatically be identified and verified by a processing system. The process also advantageously overcomes the problems of analysing unstructured data, by first locating some, relatively structured data (e.g. company identifier), and then using this to cross reference with another database, and obtain a further data element which can be cross referenced back, by the system, with the unstructured data. This has the technical advantage of improving processing of the unstructured data to obtain information.

In an embodiment, the unstructured data may be processed by an optical character reading (OCR) application to identify the predetermined data element.

In an embodiment, other data elements may be obtained from the database, or other external databases, utilising the predetermined data element, or utilising other data elements located (such as the further data element, or any other data elements).

For example, if an ABN is obtained as the predetermined data element, the Australian Business Registry database (ABR) may be accessed and the ABN used to locate the official business name or trading name of the company. This can then be cross-checked with the invoice by processing the unstructured data from the document and matching against the official business name or trading name obtained from the ABR. Verification of the name may be provided.

In an embodiment the invoice can be processed by non OCR means e.g. reading PDF data directly from the PDF code or if an invoice is delivered in a structured electronic format e.g. JSON or XML and if an email is just received and forwarded to a service provided to process and check the invoice, the method may be implemented via an application on a remote device, such as a customer smart phone, tablet, or other computing device. The application may interface with a host application, hosted by a remote computing device, such as a server.

In an embodiment, the unstructured data source may comprise a coded data element, and the method may comprise the further step of decoding the coded data element.

In an embodiment, the coded data element includes a digital signature and the step of decoding comprises obtaining the signature.

In an embodiment, the method comprises the step of accessing a data base to retrieve secure data associated with the signature.

In an embodiment, the unstructured data source may comprise a document, for example an invoice of a supplier. The coded data element is associated with the document. It may be printed on the document, for example. It may be a QR code, or other code. The database may be accessed to obtain verified account details associated with the supplier signature. The account details may then be utilised to pay the supplier, for example.

In accordance with a second aspect, the present invention provides an apparatus for verification of data contained in an unstructured data source, comprising a computer having a processor, memory and an operating system supporting computer processes:

an identification process arranged to search the unstructured data source for a predetermined data element recognisable in the unstructured data, and locate the predetermined data element;

a checking process arranged to access a database source and, using the located predetermined data element, to locate at least one further data element stored in the data source, associated with the predetermined data element, and a comparison process arranged to search the unstructured data source for the located further data element by comparing the unstructured data with the further data element obtained from the data source, and to provide a verification indication based on the comparison.

In an embodiment, the unstructured data may be a physical or electronic (e.g. PDF) document. The document may be an invoice, or a statement, or another applicable document, for example, from a supplier to a customer.

In an embodiment, the identification process may comprise an optical character reading (OCR) application.

In an embodiment, the apparatus comprises a decoding process arranged for decoding a coded data element of the unstructured data. In an embodiment, the coded data element includes a digital signature. In an embodiment, the checking process is arranged to access a database to retrieve secure data associated with the signature.

In accordance with a third aspect, the present invention provides a computer program, comprising instructions for controlling a computer to implement a method in accordance with the first aspect of the invention.

In accordance with a fourth aspect, the present invention provides a non-volatile computer readable medium, providing a computer program in accordance with the third aspect of the invention.

In accordance with a fifth aspect, the present invention provides a data signal, comprising a computer program in accordance with the third aspect of the invention.

In accordance with sixth aspect, the present invention provides a method for verification of supplier details of a supplier of goods or services, comprising the steps of:

decoding a coded data element associated with the supplier, to obtain a digital signature associated with the supplier;

accessing a database and obtaining supplier details associated with the signature.

In an embodiment, the coded data element is provided by a document associated with the supplier. The document may be an invoice, for example. In an embodiment, the supplier details may be account details.

In an embodiment, the method comprises the further step of providing a document having the coded data element. The document may be in electronic form.

In accordance with a seventh aspect, the present invention provides an apparatus for verification of supplier details of a supplier of goods or services, the apparatus comprising a computer having a processor, memory and operating system supporting computer processes:

a decoding process arranged to decode a coded data element associated with the supplier, to obtain a digital signature associated with the supplier;

a checking process arranged to access a database and obtain supplier details associated with the signature.

In an embodiment, the coded data element is provided by a document associated with the supplier. The document may be an invoice. In an embodiment, the supplier details may be account details.

In accordance with an eighth aspect, the present invention provides a computer program, comprising instructions for controlling a computer to implement a method in accordance with the sixth aspect of the invention.

In accordance with a ninth aspect the present invention provides a non-volatile computer readable medium, providing a computer program in accordance with the eighth aspect of the invention.

In accordance with a tenth aspect, the present invention provides a data signal, comprising a computer program in accordance with the eighth aspect of the invention.

In accordance with an eleventh aspect, the present invention provides a document, the document including a coded data element arranged to be decoded to provide a digital signature which can be utilised in accessing a database and obtaining details associated with the signature.

In an embodiment, the document is a supplier invoice. In an embodiment, the details are account details of the supplier.

BRIEF DESCRIPTION OF THE DRAWINGS

Features and advantages of the present invention will become apparent from the following description of embodiments thereof, with reference to the accompanying drawings, in which;

FIG. 3 is a representation of data stored in a Vendor Master Database;

DETAILED DESCRIPTION OF EMBODIMENTS

Figure 1:
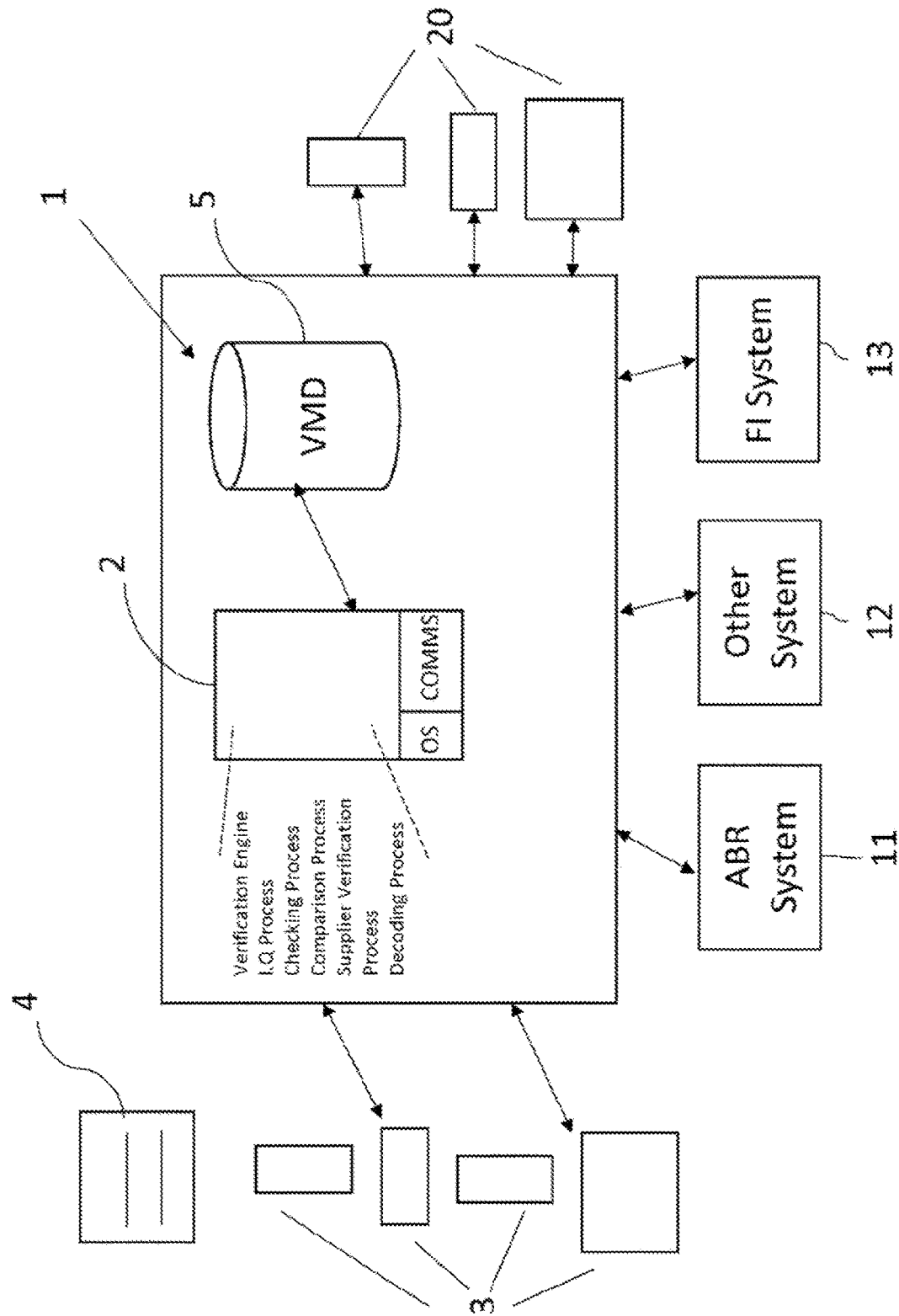
FIG. 1 is a schematic block diagram of an apparatus in accordance with an embodiment of the present invention.

Referring to FIG. 1, an apparatus for verification of data in accordance with an embodiment of the invention is generally designated by reference numeral 1. The apparatus comprises a computing system 2 which, in this embodiment, is a server computing system 2 which may be hosted remotely e.g. in the "Cloud". In this example, the computer system 2 is arranged to receive unstructured data from an unstructured data source, such as a scanned document 4, for example, and process the unstructured data to provide verification of various data elements contained in the unstructured data source.

In one example, the unstructured data source is a supplier's invoice, which a customer or customers' accounts department needs to assess for payment. The embodiment is not limited to the unstructured data source being an invoice, however, and it could be any unstructured source requiring verification of data elements.

The unstructured data may be provided via remote user devices 3, in this embodiment. The remote user devices 3 may be any computing devices, such as smart phones, tablets, laptops or any other computing device. In this example, the user devices 3 are provided with application software (an "App") which is arranged to obtain the unstructured data from the unstructured data source 4 and communicate with the apparatus 2. The App is also arranged to generate interfaces on the user device 3.

In this example, devices 3 have a camera which is arranged to take a photograph of the unstructured data document 4 (e.g. an invoice).

The unstructured data is processed by the system 2, which includes an identification process (a computer application) arranged to search the unstructured data source for a predetermined data element. In this example, the predetermined data element may be some company/supplier identification, such as a Company Registration Number (in Australia, an ABN or ACN).

Once this "key" predetermined data element has been obtained, the next step in the process is for a "checking process" (a computer application) of the apparatus 2 to access a remote data source 5. In this embodiment, the remote data source 5 is a database which contains the predetermined data element and other data. In the example where the predetermined element is an ABN or ACN, the other data may be other data relating to the company/supplier, such as bank account number, or other information. The checking process utilises the predetermined data element obtained by the identification process from the unstructured data source, to look up a table in the database 5 and locate a further data element(s), for example the bank account number and BSB associated with the ABN/ACN. A comparison process (a computer application) then takes this further element and processes the unstructured data to find a similar further data element in the unstructured data. For example, where the unstructured data source is an invoice, there will be an account number somewhere on the invoice to enable the customer to pay the invoice. The comparison process takes the known account number from the database 5, uses it to locate the same number in the unstructured data, and if found as a number (without extra characters or digits) the comparison process can then verify to the user device 3 that the account numbers match and therefore the user can pay the account. Where it is not found in the unstructured data, the verification provides an alert to the user device 3 that there is no match since the known account doesn't appear on the invoice and further information is required before the account can be paid.

This embodiment has the advantage that it is able to identify and analyse required data in an unstructured database, by first looking for data that is likely to be in a predetermined format and therefore identifiable from the unstructured data (e.g. an ABN/ACN) and then using that obtained data to refer to another database to obtain further data that can then be used for further analysis of the unstructured data. This therefore facilitates rapid identification and analysis of unstructured data, which otherwise would be very difficult by known analysis processes.

Figure 2:
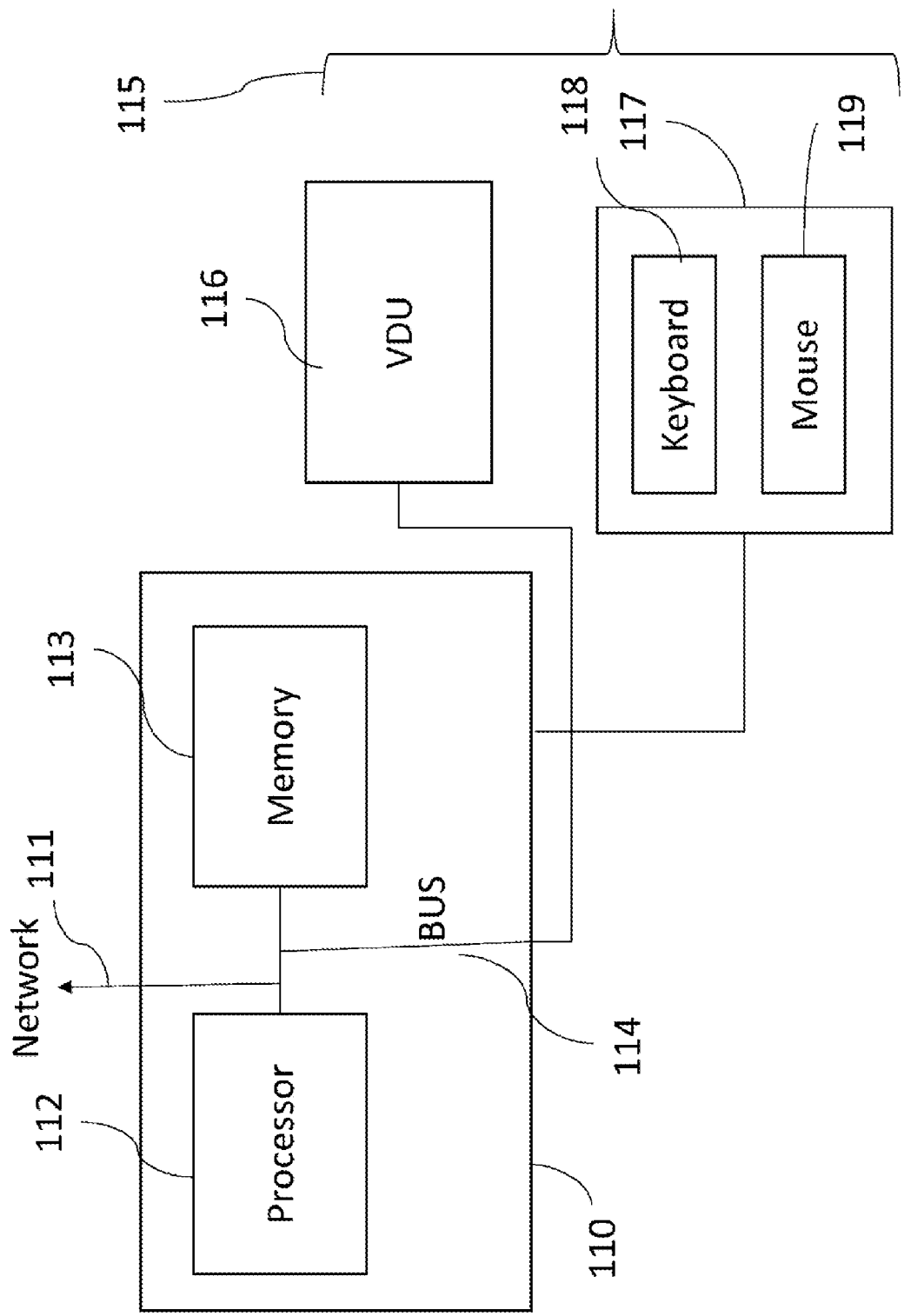
FIG. 2 is a schematic block diagram of a computing system which may be utilised in an embodiment of the present invention.

FIG. 2 is an example block diagram of a computing system which may be utilised in implementation of embodiments of the present invention. For example, it may be utilised to implement the apparatus 2 for verification of data.

The illustrated computing system comprises a computer which includes a processor 112 and memory 113. The processor 112 is arranged to process programme instructions and data in a known manner. Memory 113 is arranged to store programme instructions and data also in a known manner. Processor 112 may constitute one or more processing means, such as integrated circuit processors. The memory 113 may comprise any known memory architecture and may include hard disk, IC memory (ROM. PROM, RAM, etc.), floppy disks and other types of additional memory such as CD ROM, and any other type of memory.

A BUS 114 is provided for communication between the processor 112 and memory 113 and also communication with external components. In this case the external components include a user interface 115. The user interface 115 includes a visual display unit 116 for displaying information to a user. The VDU 116 may display information in graphical format or any other format depending upon the programme instructions being processed by processor 112.

The user interface 115 also includes user input means 117 which in this example include a keyboard 118 (which in this example may be a standard QWERTY keyboard) and a mouse 119. The mouse 119 may be used to manipulate a graphical user interface (GUI) if a GUI is provided by software running on the computer. A network connection 111 is also provided for connecting to a network which may include a communication network 4 and other computers/computing systems.

The computing system of FIG. 2 may be implemented by any known type of computing hardware such as, for example, a PC, by a number of networked PCs if required to implement a system of this embodiment, by a "mainframe architecture" including a remote computer and user workstations connected to the remote computer, by a client-server architecture, including a client computer accessing a server computer over a network, or by any other computing architecture.

Parts of the system or the entirety of the system may be housed in the "cloud". This embodiment of the present invention is implemented by appropriate software providing instructions for operation of the computing system hardware to implement the apparatus of the embodiment and implement the method of the embodiment.

Part of the system or the entire computer system may be portable, and may be implemented, for example, by a laptop or tablet computer, smartphone or other portable device.

The computing system is provided with an operating system and various computer processes to implement functionality. The computer processes may be implemented as separate modules, which may share common foundations such as routines and sub-routines. The computer processes may be implemented in any suitable way and are not limited to separate modules. Any software/hardware architecture that implements the functionality may be utilised. The computing system 110 may be implemented as a server computing system, or utilising computer resources in the cloud, or any other computer resources. In this embodiment, the apparatus 2 is implemented utilising cloud resources.

User devices 3 and other computing devices illustrated in FIG. 1 may also be implemented by a computing apparatus such as described with reference to FIG. 2.

The applicant's earlier patent application, referenced above and published as PCT Publication No. WO 2015/176105, discloses the construction and maintenance of a "Vendor Master Database" (VMD). The VMD stores verified information relating to suppliers (Vendors), which has been checked by customers and cross checked (in most cases) directly with the suppliers or cross matched across multiple independent customers for consistency. The data contained in the VMD is therefore verified to a substantial extent.

The apparatus 2 of this embodiment, is arranged to communicate with such a VMD 5 which contains verified information relating to suppliers.

FIG. 3 gives an example of information that may be stored in the VMD 5. The information includes the Business Name, the ABN, the Bank Account Name (which in some cases may be different from a business name appearing on an invoice, for example), the BSB Number and Account Number. Further information may be included, and the database is not limited to the information illustrated in FIG. 3.

VMD 5, thus provides a source of verified information which can be referenced by the system 2 to enable identification and authentication of information which may be included in the unstructured data source 4 (e.g. a copy of an invoice).

Embodiments of the invention are not limited to a database of the form shown in FIG. 3, but any database that contains verified information of the type required for the identification and authentication of the unstructured data, may be utilised. There may be many different databases of such type across jurisdictions. The requirement for this embodiment is that a database with the appropriate type of information be available for communication with the apparatus 2.

Figure 4:
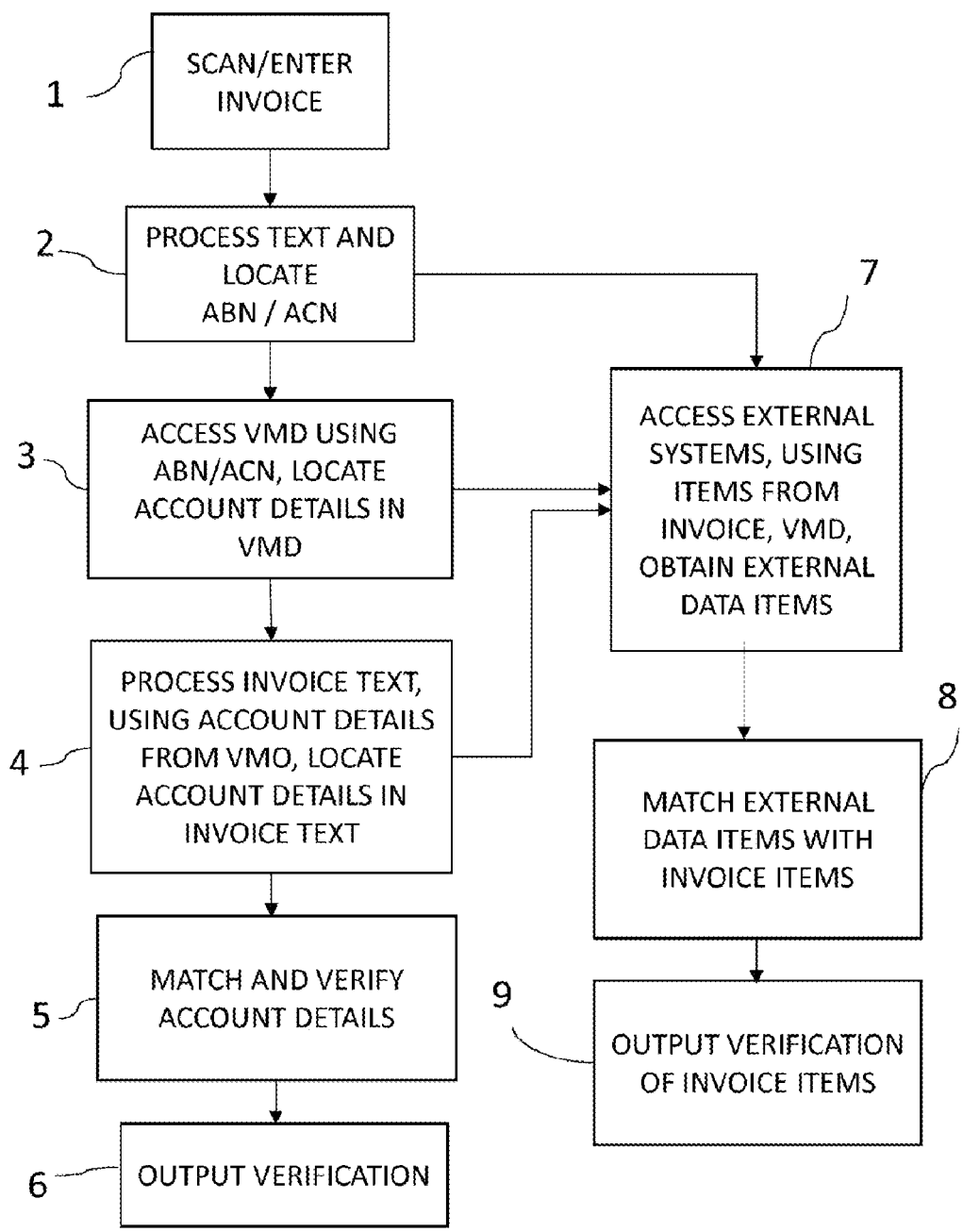
FIG. 4 is a flow diagram illustrating steps in a process in accordance with an embodiment of the present invention.

Referring to FIG. 4, a detailed description of a process implemented by the apparatus 2, for identifying or authenticating unstructured data from a supplier invoice, will now be described.

At Step 1 of FIG. 4 a customer, using the device 3 scans an invoice 4. The scanned image is transmitted to the apparatus 2. It may be transmitted in the form of a photograph or a PDF, or similar.

The apparatus 2 includes a verification engine 10 which is arranged to identify predetermined data and verify data from the scanned invoice.

At Step 2, the data is processed by an identification process which is arranged to locate and identify a predetermined data element. In this case an ABN or ACN of the supplier. In other jurisdictions, or for other applications, other predetermined data elements may be identified.

In this embodiment, the identification process comprises an optical character recognition (OCR) application.

One of the problems with current applications available for analysing unstructured data, is that it is very difficult to accurately interpret and understand the converted textual information. For example, a bank account number can be anything between 2 and 10 digits, so to try and identify what is an account number on any generic invoice (that typically have many different numbers. e.g. amounts, invoice numbers. ABNs, references dates postcodes etc.) reliably is highly problematic. Current applications rely on looking for preceding labels such as "Account Number" followed by a number. There is no standard way of displaying this on invoices. For example, it could be printed as "Acc No", or "Account" or "Account Details" or "ACCT. Info" or a virtually unlimited multitude of other permutations. Further complicating this is that the word "account" could be used in text elsewhere on an invoice e.g. "Customer Account" number or "Account $500 overdue". Further the word "Account" may not even precede the bank details e.g. it could simply say "Payment Details 032188 123456".

It is therefore very difficult to accurately identify and analyse this type of unstructured data. Currently available technical processes, such as software for parsing and identifying sections of text, are unreliable with regard to this type of unstructured data.

This embodiment uses a novel technical process comprising analysing the unstructured data to obtain first of all a predetermined data element (in this case ABN or ACN) and then a process of accessing a separate database containing verified information (VMD 5), using the predetermined data element obtained from the unstructured data as a cross reference to obtain further data from the database, and then using that further data for further analysis of the unstructured data.

The identification process is arranged to process the unstructured data from the invoice to look for an 11-digit number (in this embodiment). All valid tax invoices in Australia must have an 11-digit ABN or ACN. The ABN is also a specialised, structured number—it is an 11-digit number structured as a 9-digit identifier with two leading check digits. The identification process can therefore identify the ABN, and check whether its structure is correct for an ABN, to a very high degree of certainty. The apparatus 2 may also be arranged to contact and make an external direct check with an external database such as the Australian Business Registry (ABR) (see later).

In this embodiment, the OCR application processes the full document (e.g. the full page or pages). The application is aware of the structure of the ABN (e.g. number of digits and check sum etc.). The application looks for a sequence of the correct number of numeric characters, ignoring spaces, for example, dashes, etc. When such a sequence is located, it calculates the check sum and if invalid, looks for the next sequence, and so on. If the check sum is valid and everything is in accordance with the correct structure, then the checking process accesses the VMD 5.

At step 3, the checking process accesses the VMD 5 and, utilising the ABN/ACN, accesses the database table and locates other details from the VMD. In this case, the account details for the suppliers' bank account, contained in the VMD 5, are located.

Once the account details associated with the ABN have been retrieved, the comparison process processes the invoice text, using the obtained account details as a reference, to locate the account details in the invoice text (Step 4). The account name can also be located in the database (and other information can be located from the database) and the invoice text processed to locate the account name and any other details.

At step 5 the comparison process compares the details obtained from the VMD 5 with the details obtained from the processed text, to confirm if the details in the invoice are correct. If the details are not found, it indicates the invoice has incorrect details.

At Step 6, verification can be output of the details required by the user.

Figure 7:
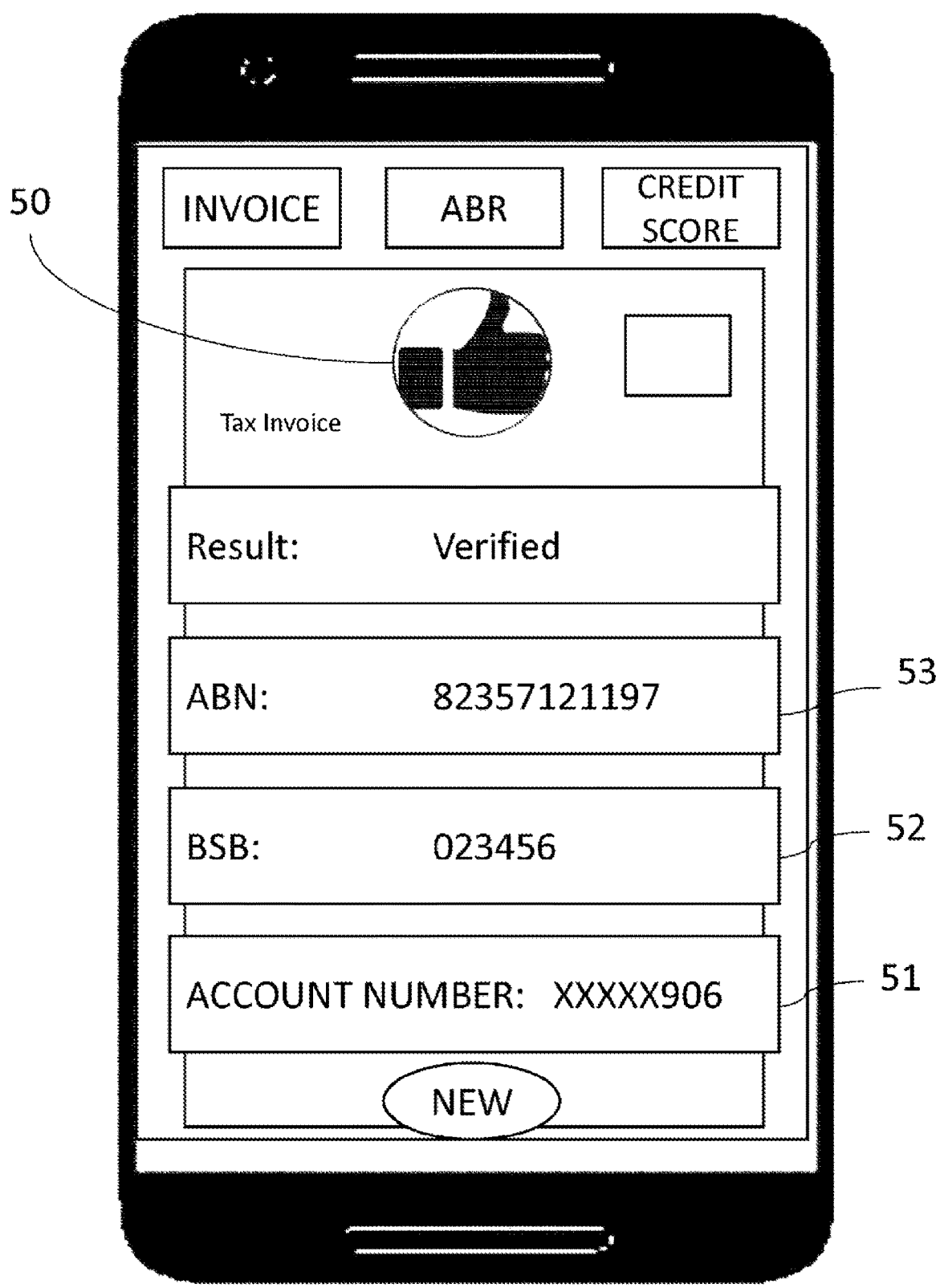
FIGS. 7 to 9 are examples of displays which may be produced by an interface of a user device, in accordance with an embodiment.

FIG. 7 illustrates an interface which may be produced on the user device from the comparison process and verification engine 10, outputting a verification following a check of a supplier. In this example, a "thumbs up" icon 50 is produced on the interface, indicating that the bank account details and BSB 51, 52 have been verified for the ABN 53.

If the correct details are not located, the interface can issue a warning to the user that the invoice could have fake details and not to trust the details without checking with the supplier first.

This checking and verification process can be done in a very short time space, once the user has scanned the invoice using the camera. The user can therefore have a surety that the suppliers' details are correct and there is nothing fraudulent, before he pays the supplier.

The verification engine 10 is also arranged to access external systems, apart from the VMD 5, to obtain and check external data items (Step 7). The external systems may include any external system. FIG. 1 shows the ABR system, which is the Australian Business Registry system (reference numeral 11). In Australia the ABR is a publicly available system which includes a number of company details which may be looked up via the ABN obtained from the unstructured data source. Other external systems include financial institution systems (FI system 12). The verification engine may be arranged to contact FI systems, and obtain details directly from them. This could be by way of obtaining login details from the suppliers to enable access to the FI system to obtain information, for example. Any other system 13 may also be accessible via the verification engine 10.

Any external data items obtained from external systems may be matched by processing with the unstructured data from the invoice (Step 8) to output a verification of invoice items related to the external data items (Step 9).

In one example, the name on the invoice can be matched with the official business name available in the ABR by searching for names in the unstructured data. Additionally, the ABR data from the external ABR system could be referenced to determine whether the supplier is registered for GST (Goods and Services Tax) and can check the data on the invoice to see if GST is being charged. If the ABR data says that the supplier is not registered for GST, for example, but they are still charging the GST on the invoice, the user can be warned that GST is being charged when it shouldn't be.

Also by checking the name, the system can warn whether an invoice is using another entity's ABN to subvert not being registered for GST, but still charging it.

Figure 8:
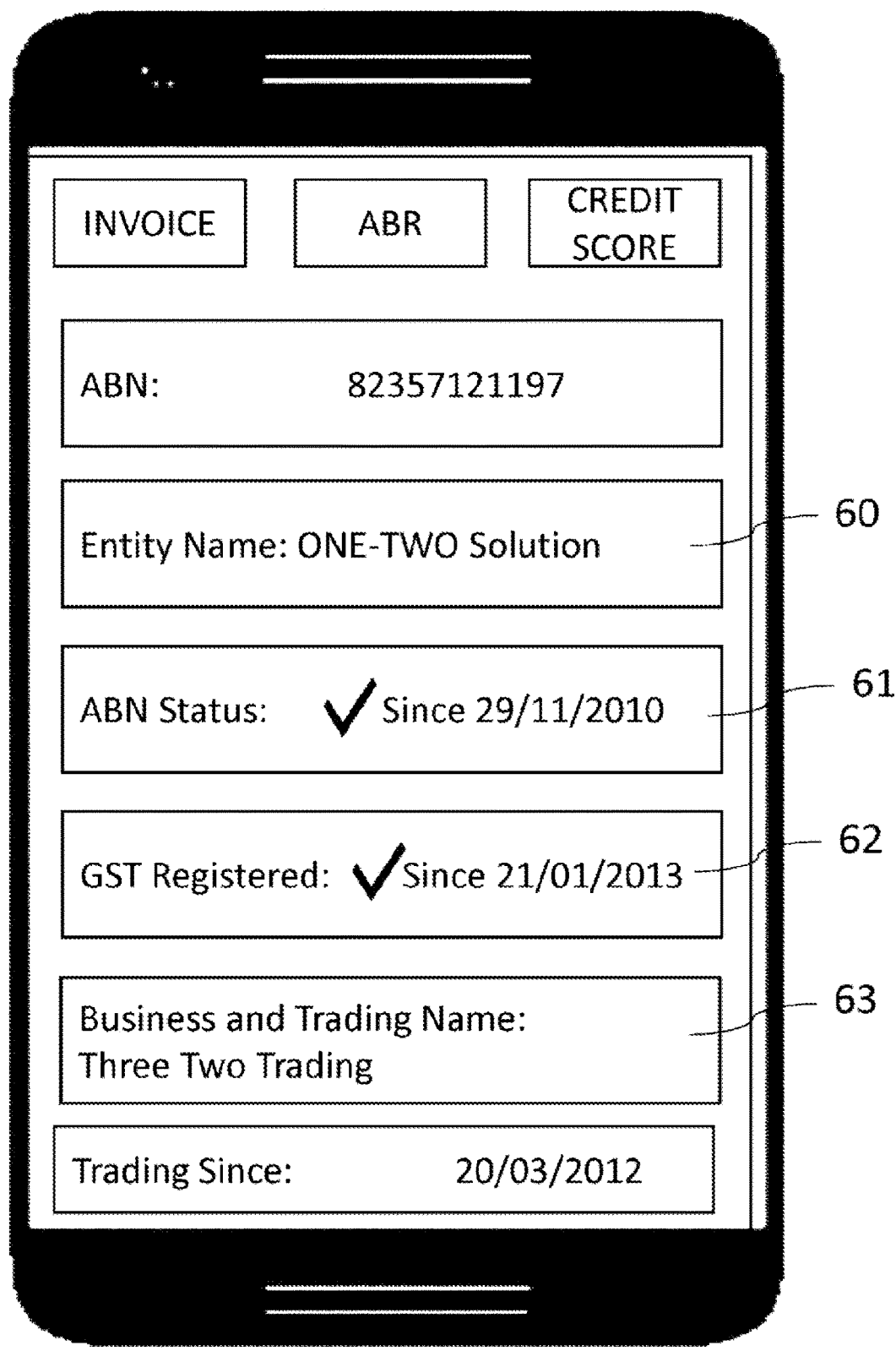

FIG. 8 illustrates the user interface output following check of the ABR to obtain the entity business name 60 ABN status 61 and GST status 62. Business and Trading name 63 can also be cross referenced and checked.

Figure 9:
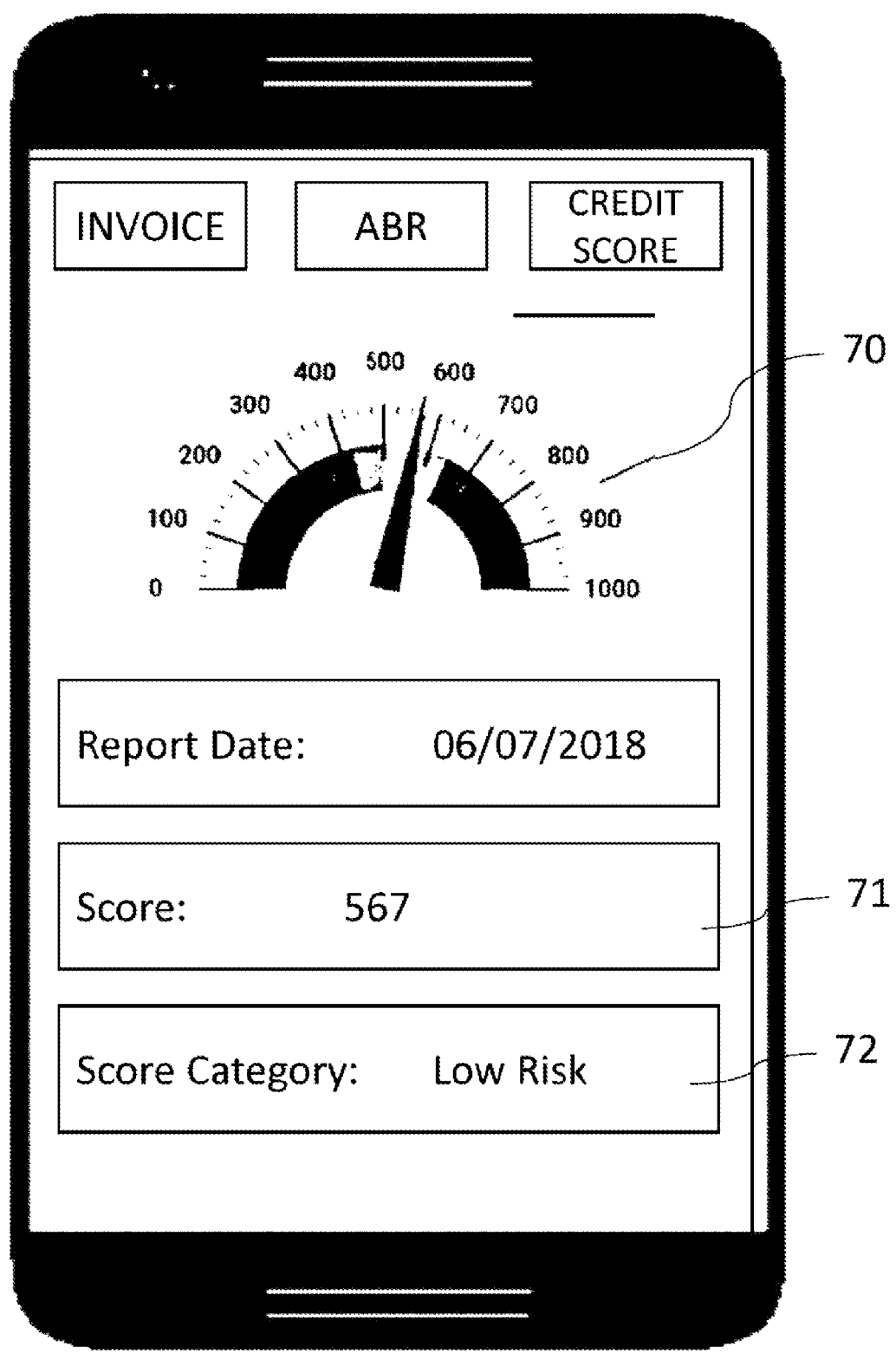

Further, other sources can be checked such as credit checks on the ABN through a third-party service. The system can therefore warn if, for example, the business has a default notice pending or is an administration or simply has a bad credit score. FIG. 9 shows the output result of a credit check 70 on a user interface. Credit score 71 and score category 72 is also provided.

More data from other sources can be cross matched and the checks are not limited to the above. For example, searches on directors of the company against criminal records could be checked, and any other data that's available could be checked. In general, the system allows a customer to check as much as possible about the person they are paying (supplier) before paying them.

If the ABN is not located on the invoice (it generally should be) or is not located in the VMD 5 or other database, or other required information is not located, the system allows a user to click on an icon (not shown) on their interface and enter the email address or mobile phone number or other contact of the supplier to invite them to verify their bank and other details to the system 2. Once the details have been verified by the system, the verification engine 10 is arranged to send a "push notification message" directly to the user 3 to alert the user that the details are now in the system so that they can check the details on the invoice.

Figure 5:
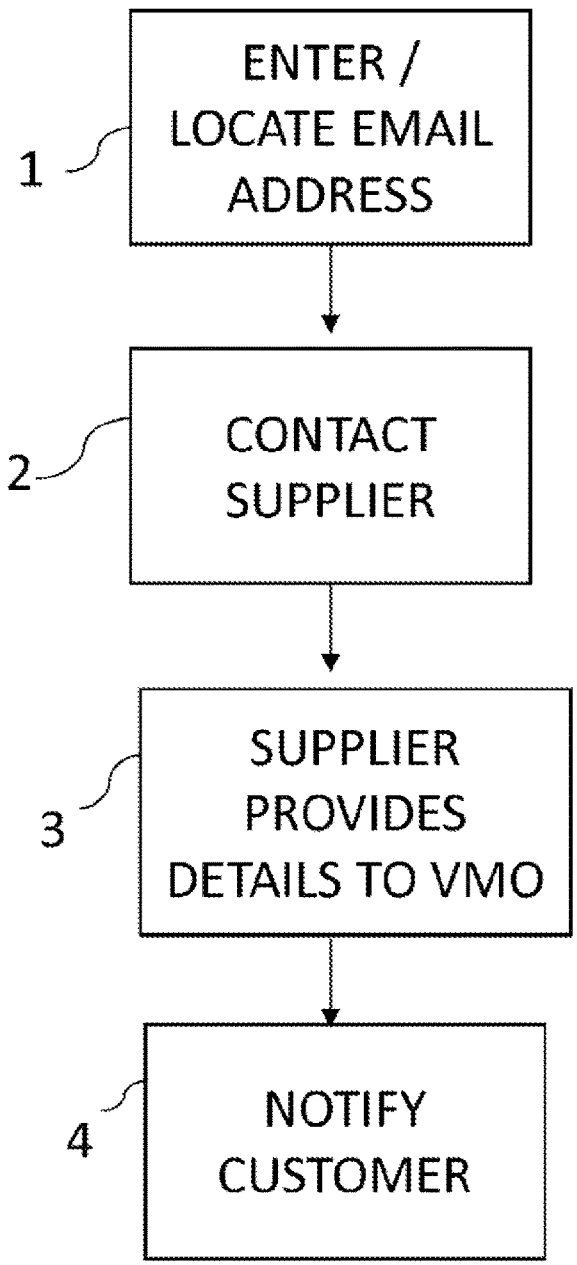
FIGS. 5 and 6 are flow diagrams illustrating steps in processes of embodiments.

This process is shown in FIG. 5:

At Step 1, the email address is either obtained from the invoice and entered, or entered by the user via the device 3, or otherwise obtained. Other contact details may also be used.

At Step 2, the supplier is contacted by the apparatus 2.

At Step 3, the supplier provides their details to the VMD 5. This may be done in accordance with the processes disclosed by the patent applications referenced previously, or by any other means.

At Step 4, the customer is notified by SMS, email or otherwise via the application on their device 3 (or through any other method e.g. an automated call or instant message).

Figure 6:
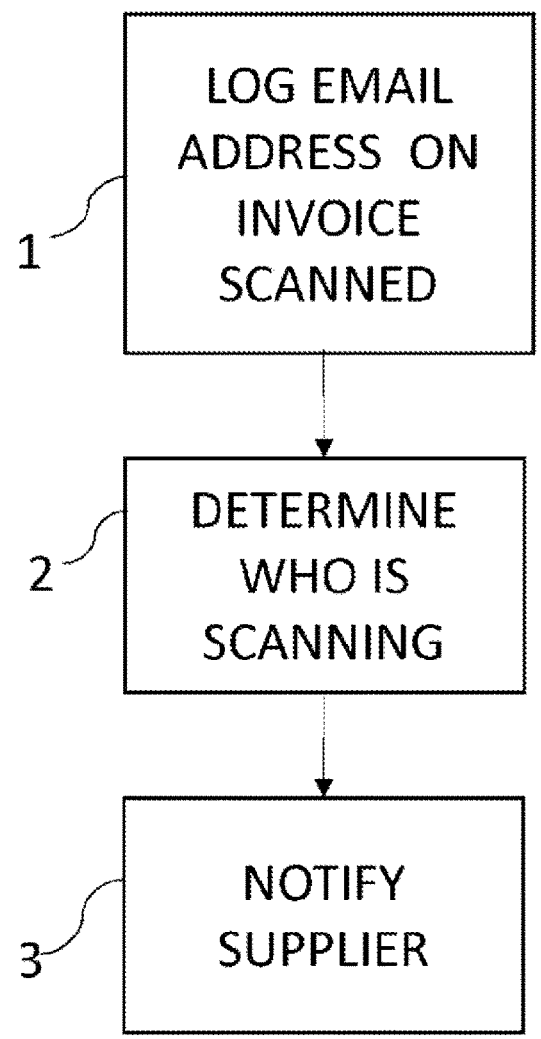

In an embodiment, the apparatus 2 can also liaise with and provide information for suppliers via suppliers' devices 20 (see FIG. 1). The suppliers' devices 20 may comprise any device, such as a PC, laptop, smart phone and tablet device. In this embodiment, every time someone scans an invoice (e.g. a customer) using the apparatus 2, the apparatus 2 can record the email address on the invoice (or other contact details) and log it (Step 1, FIG. 6). Periodically (e.g. at the end of each week) (or in real-time) the apparatus 2 can contact the supplier via the device 20 and let them know how many people scanned their invoice (Step 3). The apparatus can also allow the supplier to see who is scanning their invoices and why. An App may be provided to the supplier device 20 to enable them to interface with the apparatus 2.

This embodiment provides a novel way of linking suppliers to their customers to ensure the integrity of the electronic communication so they can be alerted to anything unusual. There is currently no linkage between customer processing invoices and suppliers, so because of fraud concerns the efficiencies of electronic invoicing are being lost because recipients are no longer trusting it.

For example, if anyone scans photoshopped/altered invoices the apparatus 2 is arranged to alert suppliers (substantially in real time) that someone is faking their invoices, so they have early warning.

In an embodiment, if a photoshopped invoice is scanned, this enables an automatic notification to be sent by the system to all the supplier's customers to warn them not to pay any such invoice. This has the advantage of being a unique way of "crowd testing" all invoices in the field and enabling warnings to other customers of suppliers that fake invoices are being distributed. An application could automatically send emails to all the Supplier's customers. In this embodiment, an application could be hosted on the supplier system with access to all the email addresses of all the supplier's customers, so that all the supplier's customers would be notified that invalid invoices are circulating.

In a further embodiment, the unstructured data source may comprise a coded data element. For example, where the unstructured data source is an invoice, it may contain a coded data element such as a QR code or other code. In this embodiment, the apparatus may comprise a decoding process to decode the coded data element. The coded data element may include a digital signature. The database may be accessed using the signature, to retrieve secure data associated with the signature. Account details, for example, may be retrieved (or any other secured data).

This code could be used in addition to the process and apparatus described in the above embodiments, or separately therefrom.

Supplier invoices may be printed with the code, to augment security.

In embodiment, suppliers could provide invoices with the code on the invoices, and this would be a secure way of obtaining banking details of a supplier.

In the above embodiments, the system is arranged to scan a hardcopy invoice. The invention is not limited to this. For example, electronic invoices may be processed by the system, by the user device 3 sending the electronic invoice to the apparatus 2 which then processes the unstructured data in the same way.

Further, the system is not limited to processing of invoices. Any document, or any unstructured data may be processed using the process and apparatus in accordance with embodiments of the invention. Structured data eg JSON or XML data sent by a supplier or their ERP/Accounting system can also be processed using the process and apparatus in accordance with embodiments of the invention.

Further, in the above embodiment, the data being checked is particular to Australia (e.g. ABN, ABR, Australian Bank Account Number etc.). The invention is not limited to this. In other embodiments, the apparatus may be configured for data types and formats of other jurisdictions.

The unstructured data source discussed above is an invoice. The invention is not limited to invoices, however. Any document may be analysed and content validated via embodiments of the invention. For example, bank statements, loan applications, insurance certificates may be analysed to locate known data and compare against the same known data in a database, to determine the validity of the document. Any other document may be analysed.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. An apparatus for verification of data contained in an unstructured data source, comprising a processor, memory storing machine readable instructions, wherein the processor is configured to execute the machine readable instructions to automatically process the unstructured data source to output a verification indication, by:

locating, by the processor, a data element having a first predetermined format from the unstructured data source, by converting or decoding the unstructured data source to obtain machine-readable data; and analysing, by the processor, the machine-readable data to identify a first text string having the first predetermined format, the identified first text string being the located data element;

in response to the processor locating the data element, locating, by the processor, at least one further data element which is associated with the located data element, by the processor accessing a database source to look up the further data element using the located data element, the further data element having a second predetermined format;

in response to the processor locating the at least one further data element, searching, by the processor, the machine-readable data to locate a second text string which has the second predetermined format;

the processor comparing the located second text string with the located further data element obtained from the database source; and the processor determining the verification indication based on the comparison, and outputting the verification indication;

wherein the unstructured data source comprises a coded data element associated with an issuer of the unstructured data source, and the processor is configured to execute the machine readable instructions to:

decode the coded data element associated with the issuer, to obtain a digital signature associated with the issuer; and access an issuer database and obtaining issuer details associated with the digital signature.

2. An apparatus in accordance with claim 1, wherein the unstructured data source is a document.

3. An apparatus in accordance with claim 2, wherein the unstructured data source is an invoice.

4. An apparatus in accordance with claim 1, wherein the data element having the first predetermined format is a company identifier.

5. An apparatus in accordance with claim 1, wherein the unstructured data source comprises a coded data element, and the processor is configured to execute the machine readable instructions to decode the coded data element.

6. An apparatus in accordance with claim 5, wherein the coded data element includes a digital signature, and the processor is configured to execute the machine readable instructions to obtain the digital signature, and to access a database to retrieve secure data associated with the digital signature.

7. A data verification system, for verification of data contained in an unstructured data source, the system comprising a controller comprising a processor, memory storing machine-executable instructions, the processor being configured to execute the instructions to automatically process the unstructured data source to output a verification indication:

the data verification system comprising:
a data identification module;
a database checking module;
a comparison module; and
an output module;

the data identification module being configured to receive the unstructured data source and locate a data element having a first predetermined format from the unstructured data source, by
converting or decoding the unstructured data source to obtain machine-readable data; and analysing the machine-readable data to identify a first text string having the first predetermined format, the identified first text string being the located data element;

the database checking module is configured to, in response to the data identification module locating the data element, search a database source to look up a further data element having a second predetermined format using the located data element;

the data identification module being further configured to, in response to the database checking module locating the at least one further data element, search the machine-readable data to locate a second text string which has the second predetermined format;

the comparison module being configured to, in response to the data identification module locating the second text string, compare the located second text string with the located further data element obtained from the database source; and the output module being configured to determine the verification indication based on the comparison, and output the determined verification indication;

wherein the unstructured data source comprises a coded data element associated with an issuer of the unstructured data source, and the processor is configured to execute the machine-executable instructions to:

decode the coded data element associated with the issuer, to obtain a digital signature associated with the issuer; and access an issuer database and obtaining issuer details associated with the digital signature.

8. A method for automatically processing data contained in an unstructured data source to output a verification indication, comprising:

processing, using a processor, the unstructured data source to locate a data element having a first predetermined format, by converting or decoding the unstructured data source to obtain machine-readable data; and analysing the machine-readable data to identify a first text string having the first predetermined format, the identified first text string being the located data element;

in response to locating the data element, locating, by the processor, at least one further data element which is associated with the located data element, by the processor accessing a database source to look up the at least one further data element using the located data element;

in response to locating the further data element, searching, by the processor, the machine-readable data to locate a second text string, the second text string having a second predetermined format;

in response to locating the second text string, comparing, by the processor, the further data element with the second text string;

determining, by the processor, the verification indication based on the comparison; and outputting the verification indication;

wherein the unstructured data source comprises a coded data element associated with an issuer of the unstructured data source, and the method further comprises:

decoding the coded data element associated with the issuer, using the processor, to obtain a digital signature associated with the issuer; and accessing, by the processor, an issuer database and obtaining issuer details associated with the digital signature.

9. The method in accordance with claim 8, wherein the unstructured data source is a document.

10. The method in accordance with claim 9 wherein the unstructured data source is an invoice.

11. The method in accordance with claim 8, wherein the data element having the first predetermined format is a company identifier.

12. The method in accordance with claim 8, comprising the further step of accessing further database source(s) to obtain further stored information to cross reference against the unstructured data.

13. A non-transitory computer readable medium having stored thereon machine executable instructions for implementing a method in accordance with claim 8.

\* \* \* \* \*